United States Patent [19]

Nguyen et al.

[11] Patent Number: 5,781,460
[45] Date of Patent: Jul. 14, 1998

[54] SYSTEM AND METHOD FOR CHAOTIC SIGNAL IDENTIFICATION

[75] Inventors: Chung T. Nguyen, Bristol; Francis J. O'Brien, Jr., Newport; Sherry E. Hammel, Little Compton; Bruce J. Bates, Portsmouth; Steven C. Nardone, Narragansett, all of R.I.

[73] Assignee: The United States of America as represented by the Secretary of the Navy, Washington, D.C.

[21] Appl. No.: 682,896

[22] Filed: Jun. 28, 1996

[51] Int. Cl.$^6$ .............................. G06F 17/10; H04B 1/02
[52] U.S. Cl. ......................... 364/724.011; 364/517; 364/554; 367/135; 367/901
[58] Field of Search .................. 364/724.011, 724.19, 364/148–166, 517, 553, 554, 550, 421; 367/135, 901

[56] References Cited

U.S. PATENT DOCUMENTS

| | | | |
|---|---|---|---|
| 5,493,516 | 2/1996 | Broomhead et al. | 364/553 |
| 5,537,368 | 7/1996 | O'Brien, Jr. et al. | 367/135 |
| 5,696,700 | 12/1997 | O'Brien, Jr. et al. | 364/550 |

Primary Examiner—Reba I. Elmore
Assistant Examiner—Emmanuel L. Moise
Attorney, Agent, or Firm—Michael J. McGowan; Michael F. Oglo; Prithvi C. Lall

[57] ABSTRACT

A chaotic signal processing system receives an input signal provided by a sensor in a chaotic environment and performs a processing operation in connection therewith to provide an output useful in identifying one of a plurality of chaotic processes in the chaotic environment. The chaotic signal processing system comprises an input section, a processing section and a control section. The input section is responsive to input data selection information for providing a digital data stream selectively representative of the input signal provided by the sensor or a synthetic input representative of a selected chaotic process. The processing section includes a plurality of processing modules each for receiving the digital data stream from the input means and for generating therefrom an output useful in identifying one of a plurality of chaotic processes. The processing section is responsive to processing selection information to select one of the plurality of processing modules to provide the output. The control module generates the input data selection information and the processing selection information in response to inputs provided by an operator.

15 Claims, 5 Drawing Sheets

SYSTEM AND METHOD FOR CHAOTIC SIGNAL IDENTIFICATION

STATEMENT OF GOVERNMENT INTEREST

The invention described herein may be manufactured by or for the Government of the United States of America for Governmental purposes without the payment of any royalties thereon or therefor.

CROSS-REFERENCE TO RELATED PATENT APPLICATION

This patent application is with a related patent application entitled METHOD FOR DATA GAP COMPENSATION, (Navy Case No. 75621) having same filing date U.S. application Ser. No. 682,895, now U.S. Pat. No. 5,675,553.

BACKGROUND OF THE INVENTION (1) Field of the Invention

The invention relates generally to the field of signal processing and more particularly to systems and methods of target motion analysis noise discrimination. The invention provides a system and method for processing signals to determine whether a particular mathematical "chaotic" noise structure exists.

(2) Description of the Prior Art

It is known that objects in a fluid environment such as the ocean can exhibit chaotic behavior. Since the ocean subjects a body, such as a submarine, in the ocean environment, and hence acoustic sensors carried by a submarine, to a turbulent environment, it is conceivable that an acoustic signal may contain an informational component as well as a chaotic component, and it is desirable to facilitate easy and rapid processing of data gathered by such sensors to determine whether a chaotic component exists in the signal and, if so, the nature of the chaotic component.

SUMMARY OF THE INVENTION

An object of the invention is to provide a new system, which may be implemented using a suitably programmed digital computer system, to determine whether a signal received includes a chaotic component and, if so, the nature of the component. The system provides an arrangement for processing data derived from a "real" signal, that is, a signal provided by a sensor from one or more runs by a vessel in a chaotic environment, as well as synthetic test data generated by applying numerical methods to selected ones of a plurality of types of systems of nonlinear dynamic differential equations which provide a chaotic component.

In brief summary, the invention provides a chaotic signal processing system that receives an input signal provided by a sensor in a chaotic environment and performs a processing operation in connection therewith to provide an output useful in identifying one of a plurality of chaotic processes in the chaotic environment. The chaotic signal processing system comprises an input section, a processing section and a control section. The input section is responsive to input data selection information for providing a digital data stream selectively representative of the input signal provided by the sensor or a synthetic input representative of a selected chaotic process. The processing section includes a plurality of processing modules each for receiving the digital data stream from the input means and for generating therefrom an output useful in identifying one of a plurality of chaotic processes. The processing section is responsive to processing selection information to select one of the plurality of processing modules to provide the output. The control module generates the input data selection information and the processing selection information in response to inputs provided by an operator.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1:
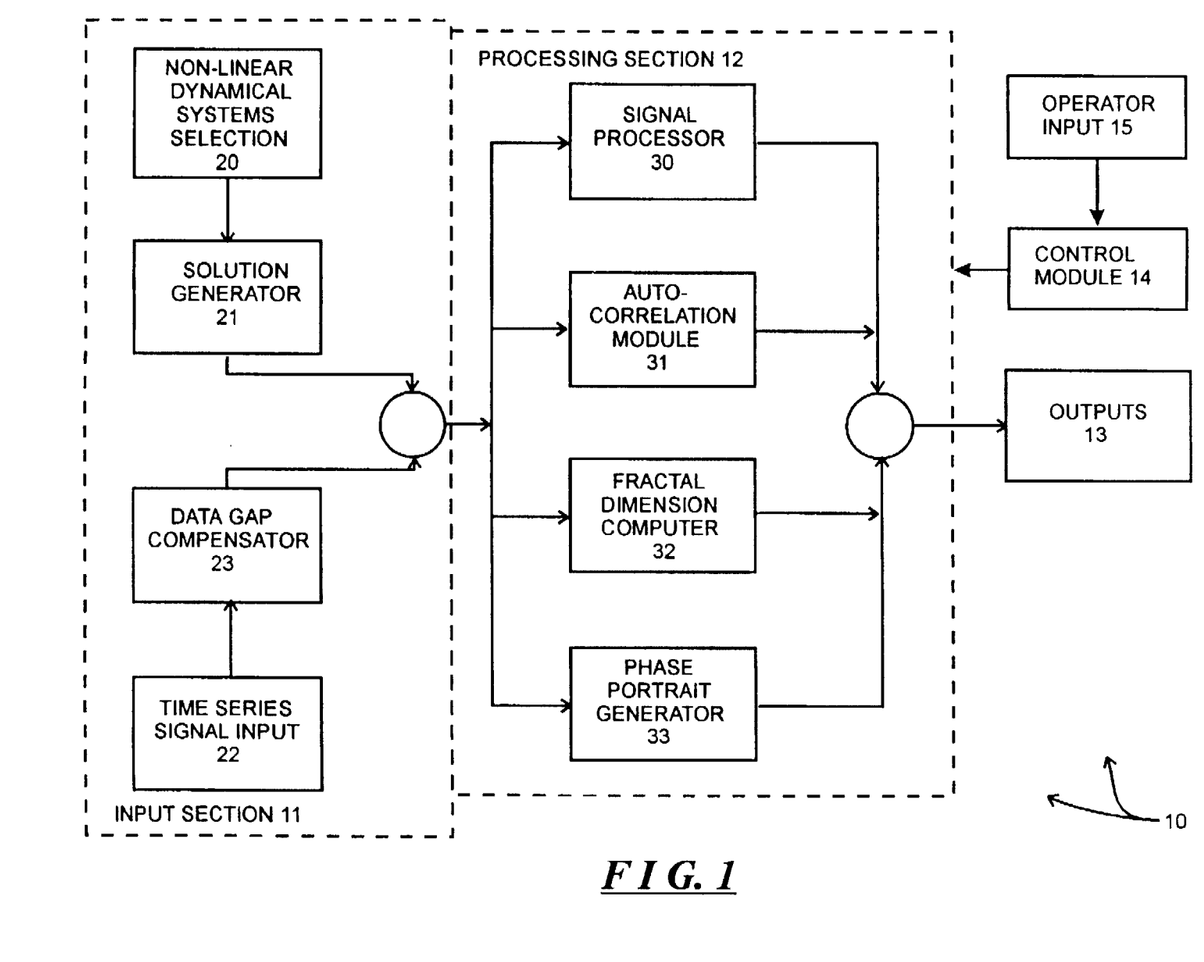
FIG. 1 is a functional block diagram of a chaotic signal processing system constructed in accordance with the invention.

FIG. 1 is a functional block diagram of a chaotic signal identification system 10 which is constructed in accordance with the invention. With reference to FIG. 1, system 10 includes an input section 11, a processing section 12 and an output section 13, all under control of a control module 14. The input section 11 receives processing parameter information provided by an operator through an operator input module 15, and input data to be processed. The input data may comprise, for example, digital data representative of the amplitude of an acoustic signal generated by an acoustic sensor (not shown) in an ocean environment. The acoustic signal data may be provided directly from the acoustic sensor, or alternatively the data from the acoustic sensor may be stored in a conventional digital data storage arrangement (not shown) for provision later to the system 10. The input section 11, if there is a gap in the sequence of digital data input thereto, will also generate synthetic data to fill in the gap.

Alternatively, instead of comprising digital data generated by, for example, an acoustic sensor, the input data may comprise synthetic digital test data which is provided to test the chaotic signal identification system 10 and to be used for comparison with input data to be classified as part of the system identification process. In one embodiment, the synthetic digital test data is generated based on a number of non-linear dynamical systems, in particular the well known Lorenz, Van Der Pol and Duffing systems, as selected by an operator. As is known, these non-linear dynamical systems are defined by sets of non-linear differential equations which, when integrated, provide a result which includes chaotic components.

The input section 11 provides data to the processing section 12. The processing section 12 includes a number of processing modules 30-33, which will be described in more detail below, which, under control of the control module 14, selectively process the input data provided by the input section 11. As will be described below in connection with FIG. 3, the operator, using operator input module 15, selects one of the processing modules 30-33 in the processing section 12 to process the input data.

The processing section 12 provides the processed data to an output section 13, which, in turn, provides the processed data to the operator in, for example, a display or printed output. The output section 13 may comprise a conventional video display device, printer or other device which may generate an image of the processed data generated by the selected processing module of the processing section 12. Alternatively or in addition, the output section 13 may comprise a digital data storage subsystem which can store the processed data generated by the processing section 12 for later use and analysis.

As indicated above, the processing section 12 includes a number of processing modules 30 through 33. Each of the processing modules 30 through 33 processes the input data using a different processing methodology, as will be described below, with the collection of methodologies being selected to provide information concerning a variety of characteristics of the signal from which the input data was generated. The operator may enable the same input data to be processed by a plurality of the processing modules 30 through 33, and observe the effect of the processing methodology by way of the display or hardcopy output provided by the output section 13.

The operator may determine from the displayed processed data that a particular selected processing methodology indicated that the particular characteristic which would be revealed by the selected processing methodology was in fact not present in the input data, and as a result may, through the operator input module 15 and control module 14, select another one of the processing modules 30 through 33 to enable another processing methodology to be performed on the input data. The operator may repeat these operations a number of times until he or she determines that the processing methodology or methodologies performed by one or more of the selected processing modules 30 through 33 have indicated that the various characteristics are or are not present in the input data.

The input section 11 includes a number of modules, including a non-linear dynamical system selection module 20 and a solution generator module 21, both of which are used in generating synthetic data, and a time series signal input module 22 and a data gap compensator module 23, both of which are used in connection with real data (which includes previously-stored data) provided by, for example, a sensor. As noted above, the synthetic data may be based on a selected one of a number of non-linear dynamical systems, including the Lorenz system, the Van Der Pol system and the Duffing system. Each of these non-linear dynamical systems is defined by a set of one or more non-linear differential equations. Each set of differential equations, in turn, requires parameter information, which is provided by the operator through the non-linear dynamical system selection module 20.

The solution generator module 21 receives the identification of the selected non-linear dynamical system and the parameters which define the selected system from the non-linear dynamical system selection module 20, and generates therefrom a synthetic digital data stream for provision to the processing section 12. As noted above, the various Lorenz, Van Der Pol and Duffing systems are defined by non-linear differential equations. As is conventional, the Lorenz system is defined by the equations:

$$\frac{dx}{dt} = \sigma(y-x) \qquad (1)$$
$$\frac{dy}{dt} = rx - y - xz$$
$$\frac{dz}{dt} = xy - bz$$

where x, y and z are dependent variables, t an independent variable, and $\sigma$, r and b are parameters whose values will be provided by the operator. The Van Der Pol system is defined by the equations $$\frac{dx}{dt} = y \qquad (2)$$
$$\frac{dy}{dt} = -x + y - x^2 y + F(t)$$

where x and y are dependent variables, t is an independent variable, and F(t) is a forcing parameter that is provided if the Van Der Pol system is to be a forced system (if the Van Der Pol system is not forced, the value of the forcing parameter F(t) will be taken as zero). The values of the parameters will be provided by the operator. In addition, the Duffing system is defined by the equations $$\frac{dx}{dt} = y \qquad (3)$$
$$\frac{dy}{dt} = x - x^3 - \epsilon y - g\cos\omega t$$

where x and y are dependent variables, t is an independent variable, and $\epsilon$ and g are parameters whose values are provided by the operator.

The solution generator module 21 performs an integration operation in connection with the non-linear differential equations and values of parameters provided by the operator to generate the synthetic digital data stream. The solution generator module 21 may use any of a number of well-known integration techniques; in one embodiment, the solution generator module 21 makes use of the well-known fourth-order Runge-Kutta integration technique with adaptive step-size which is described in, for example, J. H. Matthews, *Numerical Methods For Computer Science, Engineering & Mathematics* (Prentice-Hall 1987) page 427; and W. H. Press, *Numerical Recipes: The Art Of Scientific Computing* (Fortran Edition) (Cambridge University Press, 1992), pages 704–716.

If the operator, through operator input module 15, indicates that the system 10 is to process data that are being currently received from the sensor, the time series signal input module 22 receives the input signal from, for example, a sensor, samples the signal and generates a series of digital data values corresponding to the amplitude of the signal as received from the sensor. Alternatively, if the operator, through operator input module 15 indicates that the system 10 is to process previously received and digitized data, the time series signal input module 22 will retrieve the previously-digitized data from, for example, a digital data file identified by the operator. In either case, the time series input module 22 will provide the digital data as a data stream to the data gap compensator 23.

The data gap compensator module 23 receives the data stream from the time series input module 22, determines whether gaps exist in the data stream and, if so, generates data values to fill the gap, using a parabolic polynomial least-squared regression fit technique with a selected number of data items at both ends of the gap. The data gap compensator 23 may implement a conventional technique, such as one described in J. H. Matthews, *Numerical Methods For Computer Science, Engineering & Mathematics*, (Prentice Hall, 1987), chapter 5. Alternatively, the data gap compensator 23 may implement a technique similar to that described in the above identified related U.S. patent application for a "Method for Data Gap Compensation" (Navy Case No. 75621) incorporated herein by reference.

Figure 2:
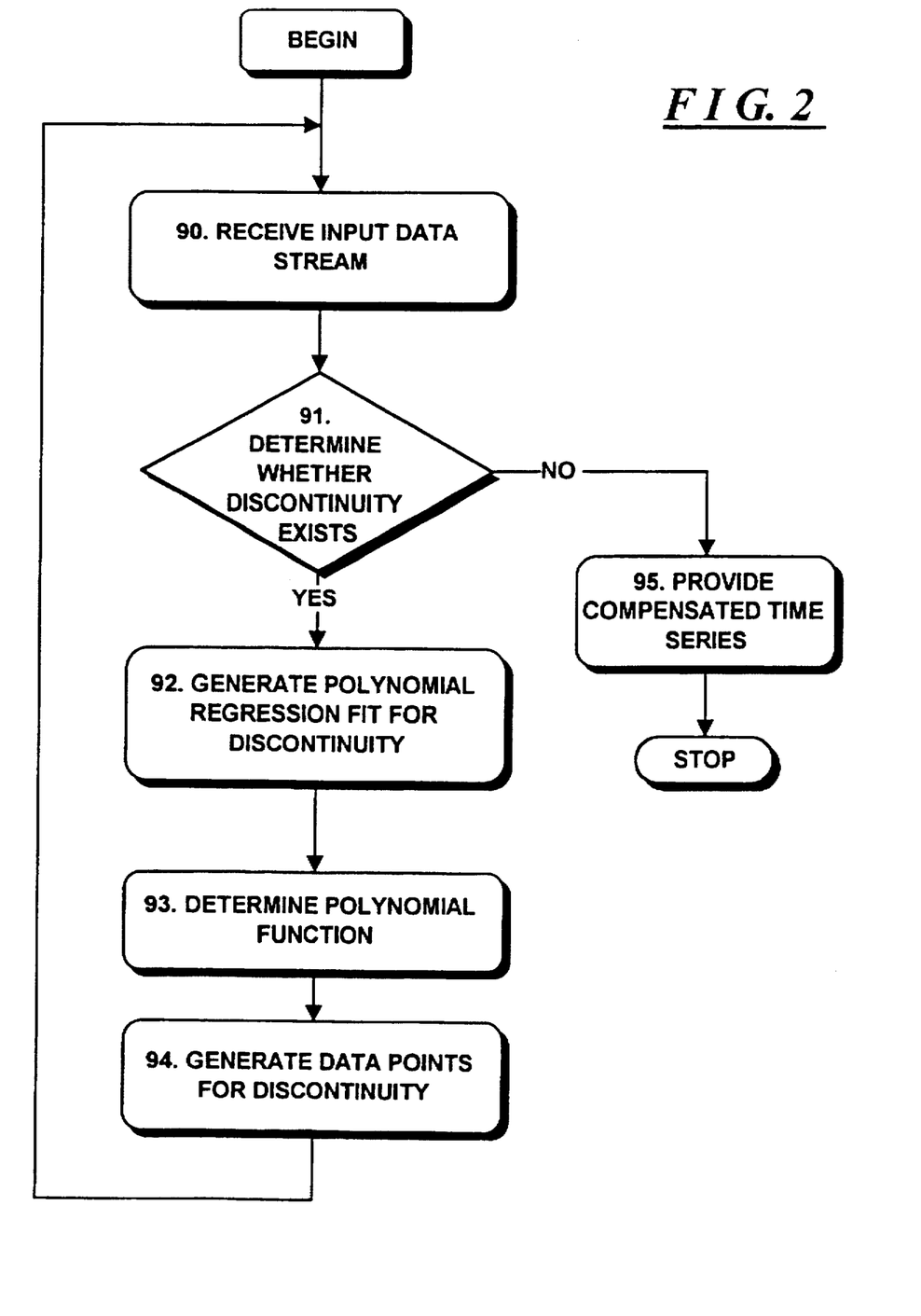
FIG. 2 is a flow chart depicting operations performed in pre-processing real data by a component of the system depicted in FIG. 1, to compensate for potential gaps or discontinuities in the real data.

The operations performed by the data gap compensator module 23 are generally shown in the flow chart depicted in FIG. 2. With reference to FIG. 2, the data gap compensator module 23 receives successive items of input digital data comprising the input data stream from the time series signal input module 22 (step 90), and scans the input stream to determine whether a discontinuity, or gap, exists in the input stream (step 91). If the data gap compensator module 23 determines that no discontinuity exists in the input data stream, it will provide the input data stream to the processing section 12 (step 95), and thereafter wait until the time series signal input module 22 provides another input data stream.

On the other hand, if the data gap compensator module 23 determines in step 91 that a data discontinuity, or gap, exists in the input data stream, it will sequence to a series of steps 92–494 and, for each such discontinuity or gap, generate a polynomial function that most closely matches the data before and after the discontinuity and use the polynomial function so generated to determine synthetic values for the digital data in the discontinuity.

More specifically, and with continued reference to FIG. 2, the data gap compensator module 23, if it determines in step 91 that a discontinuity exists in the input data stream that it receives from the time series signal input module 22, will use a least-squares regression fit methodology (step 92) in connection with a window or segment of digital data prior to and after the discontinuity. Preferably the window containing the discontinuity will be several times as large as the discontinuity, with the discontinuity centered in the window. The data gap compensation module 23 will generate a series of coefficients "a" defining an "n-th" order polynomial function $a_n x^n + a_{n-1} x^{n-1} + \ldots + a_2 x^2 + a_1 x + a_0$ which best describes the segment (step 93), where "n" is a selected value, and "x" represents the independent variable (such as time) for the input data stream. In that operation, the data gap compensator module 23 may attempt to generate polynomial functions in a series of iterations to generate trial functions of successively larger orders "n." During each iteration, after a trial function is generated, the data gap compensator module 23 will also determine a least-squares error value. Generally, it will be expected that the least-squares error value will decrease with increasing values of "n," that is, with successive iterations, until a point is reached at which it stops decreasing and may start increasing, which corresponds to a "relative minimum" least-squares error value. The function that is selected for the particular discontinuity will correspond to the function which provides the relative minimum least-squares error value. After the data gap compensator module 23 generates a polynomial function for the gap (step 93) it will use the polynomial function to generate compensated items of digital data for the missing items, thereby "filling in" the discontinuity (step 94).

After providing compensated digital data items for a discontinuity (step 94), the data gap compensator module 23 returns to step 90 to continue receiving the input data stream from the time series input module 22. The data gap compensator module 23 will perform steps 90 through 94 for each discontinuity it detects in step 91, and will provide the compensated input data series, with the discontinuities filled in (step 95) to the processing section 12.

As described above, the processing section 12 includes a number of processing modules, including a signal processing module 30, an auto-correlation module 31, a fractal dimension computation module 32 and a phase portrait generation module 33. The signal processing module 30 performs a fast Fourier transform (FFT) operation in connection with the digital input data provided thereto by the input section 11. It will be appreciated that the FFT is a conventional operation described in a number of reference works, including W. H. Press, et al., *Numerical Recipes: The Art Of Scientific Computing*, (Fortran Edition) (Cambridge Univ. Press, 1992), Chapter 12 (pp. 490–529), and J. W. Cooley & J. W. Tukey, "An algorithm for the machine calculation of complex Fourier series" in *Mathematical Computation*, April 1965, pages 297–301.

The output of the signal processing module 30, which is the Fourier transform of the input signal, is representative of the amplitudes of the various acoustic spectral components in the digital data provided thereto by the input section 11, and thus provides an estimate of the relative power in the input signal provided by the input section 11 for each of the various spectral components. If, for example, the Fourier transform for the digital data stream provided by the input section 11 has reasonably well-defined peaks at particular frequencies, that would tend to indicate that the input signal provided by the time series input module 22 was generated by one or more sources of sinusoidal signals. On the other hand, if the Fourier transform does not have such peaks, that may tend to indicate that the input signal was generated by, for example, a random or chaotic source.

It should be noted that the output of the signal processing module 30, in addition to being coupled to the output section 13 to provide, for example, a display to the operator as to the spectral content of the data provided by the input section 11, may also be used to filter noise from the data. Generally, the noise will comprise relatively high or low frequency components, which can be filtered out by removing the components from the FFT output generated by the signal processing module. The signal processing module 30 may then re-generate an output in the time domain by performing a conventional inverse FFT operation in connection with the filtered frequency domain FFT output, which may be directed to the other processing modules 31 through 33.

The auto-correlation module 31 performs an auto-correlation operation in connection with the data provided thereto by the input section 11. An auto-correlation operation is a conventional operation described in a number of reference works, including S. L. Marple, *Digital Spectral Analysis With Applications*, (N.J: Prentice Hall, 1989) pages 167–168; see also W. H. Press, et al., *Numerical Recipes: The Art Of Scientific Computing*, (Fortran Edition) (Cambridge Univ. Press, 1992), pp. 538–539. The auto-correlation operation performed by auto-correlation module 31 provides a measure of the dependence or independence of values of the digital data stream provided by the input section 11 at different points in time, and thus indicates the time variation and degree of randomness of the input data.

The fractal dimension computation module 32 generates a value corresponding to a fractal dimension for the input data provided by the input section 11. It will be appreciated that computation of fractal dimension is a conventional operation, as described in a number of publications, including T. S. Parker & L. O. Chua, "Chaos: A Tutorial For Engineers," Proceedings of the IEEE, Vol. 75, No. 8, August 1987, pages 982–1008 (reference particularly pages 995–998 and 1006–1007), and P. Grassberger, "Estimating the fractal dimensions and entropies of strange attractors," |chapter 14 of A. V. Holden (ed.), *Chaos*, (Manchester University Press, 1986)|.

Finally, the phase portrait generation module 33 generates a phase portrait or phase diagram for the input data provided by the input section 11. A phase portrait associated with a stream of digital data samples from the input section 11 graphically depicts the evolution of the digital data sample stream through successive samples. Since the digital data sample stream effectively represents the amplitude of the input data provided by, for example, a sensor, at successive points in time, the phase portrait will also graphically depict the time evolution of the data from the sensor. The phase portrait is generally described in a number of publications, including the aforementioned Parker & Chua paper, R. L. Devaney, *An Introduction To Chaotic Dynamical Systems*, (Addison Wesley Publishing Co. 1989) at pages 16–22, and A. V. Holden and M. A. Muhamad, "A graphical zoo of strange and peculiar attractors," |chapter 2 of A. V. Holden (ed.), *Chaos*, (Manchester University Press, 1986).|

Generally, a phase portrait corresponds to an m-dimensional diagram generated with orbits defined by a series of points having coordinates $$[L(t_k), L(t_k+T), L(t_k+2T), L(t_k+3T), \ldots, L(t_k+(m-1)T)]$$

where "L(t)" is the value of the "t-th" digital data sample, and "T" is an arbitrarily-selected time interval. Accordingly, for a two-dimensional phase portrait defined by the conventional Cartesian x-y coordinate plane, for each $t_k$-th sample, the x-coordinate may correspond to $L(t_k)$ (that is, the value of the $t_k$-th data sample), in which case the y-coordinate would correspond to $L(t_k+T)$ (that is, the value of a subsequent data sample, with the interval between data samples being determined by the value of "T"). If the phase portrait generation module 33 generates a phase portrait which is well-defined, that may indicate that the input data source generates a signal which corresponds to a chaotic attractor.

Figure 3:
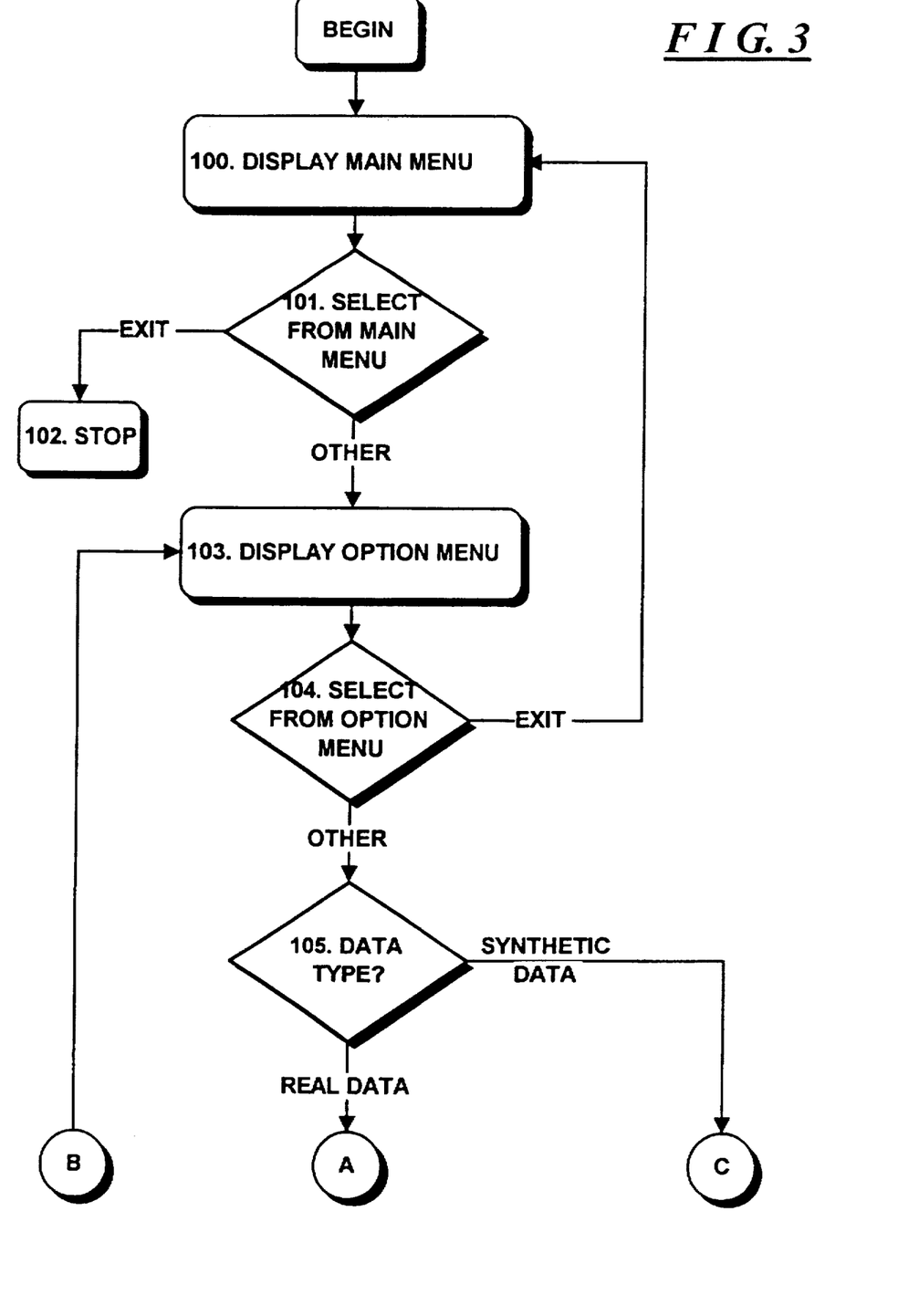
FIG. 3 is a flow chart depicting operations performed by the system depicted in FIG. 1.
Figure 3A:
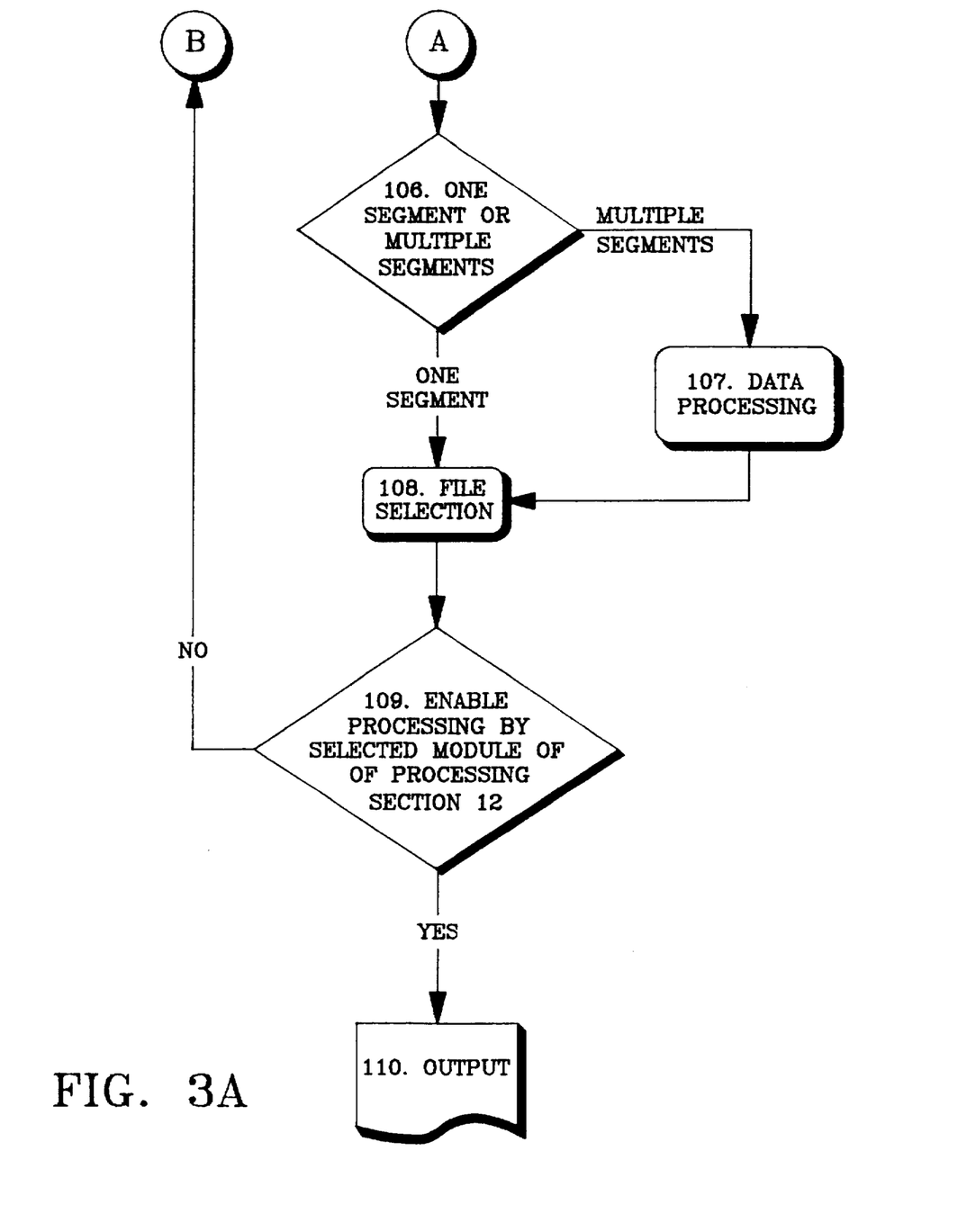
Figure 3B:
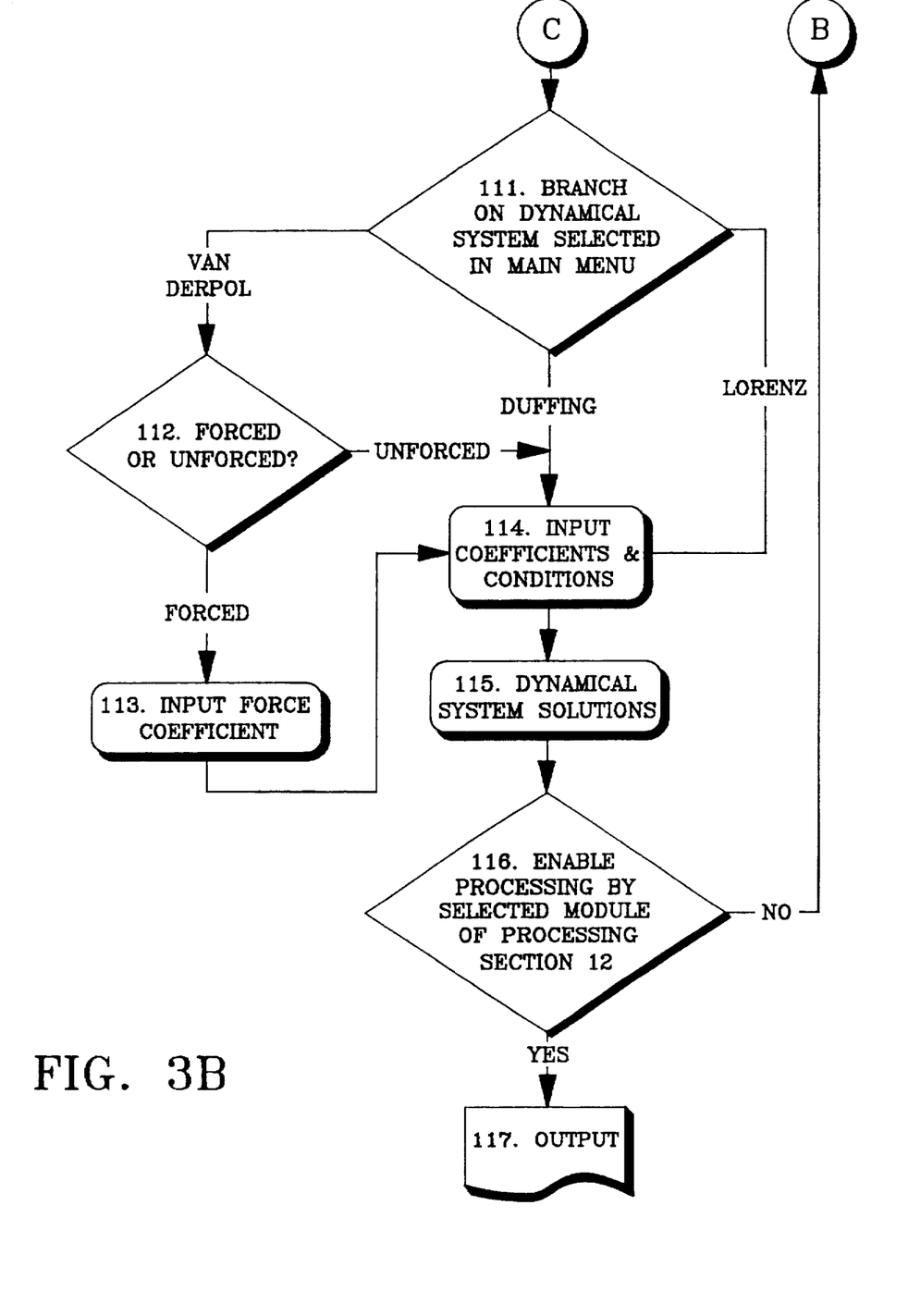

With this background, the operations performed by the system 10 will be described in connection with the flow chart in FIG. 3. With reference to FIG. 3, the control module 14, using the output section 13, initially displays a main menu to the operator (step 100). The main menu effectively enables the operator to control the input section 11. That is, the main menu allows the operator to select the type of input data to be processed by the system 10, including whether system 10 is to process real data (that is, data provided by the time series signal input module 22 and data gap compensator 23) or synthetic data (that is, data provided by the non-linear dynamical systems selection module 20 and the solution generator 21). As noted above, if the operator selects real data for processing, the system 10 may process real data in real time, as generated by a sensor/transducer (not shown) or it may process data which has been previously generated and stored by a storage subsystem (not shown) for later processing. If the operator selects synthetic data from the main menu, he or she will also select the type of non-linear dynamical system, to be used in generating the synthetic data, that is, he or she will be required to select among the Van Der Pol, Duffing and Lorenz systems. In addition, the main menu displayed in step 100 allows the operator to select to exit the system 10.

After the system 10 has displayed the main menu (step 100), the operator may select one of the entries in the main menu (step 101). If the operator selects to exit, the system will stop (step 102). On the other hand, if the operator in step 101 selects any other possibility offered by the main menu, in particular, if he or she selects a type of input data (real data, or the Van Der Pol, Duffing or Lorenz system) the system will sequence to step 103.

In step 103, the system displays an option menu. The option menu essentially allows the operator to control the operations processing section 12. In particular, the option menu allows the operator to select among the various modules 30 through 33 that will process the data stream provided by the input section 11. In addition, the option menu enables the operator to "exit," in which case the system will return to step 100, re-display the main menu and allow the operator to select again from that menu. In any case, after the system 10 displays the option menu in step 103, the operator may select from among the choices presented in that menu (step 104). If the operator selects the "exit" choice from the option menu, the system returns to step 100 to enable the system 10 to redisplay the main menu. On the other hand, if the operator selects any other choice from the option menu in step 104, the system 10 will sequence to step 105.

In step 105, the system 10 initially determines which type of data was selected by the operator from the main menu for processing by the system 10 (reference step 103). If the operator had selected real data for processing, that is, data generated by a sensor/transducer, the system will sequence to step 106 to determine whether the data should be processed as multiple segments or as a single segment. If the data has multiple segments, which should be merged into a single segment, the data is preprocessed (step 107) after which the system sequences to step 108. On the other hand, if the selected data represents a single segment, the system sequences directly to step 108.

In step 108, the system 10 selects the file selected by the operator from the option menu during step 104. The control module 14 then enables the selected file to be coupled to the time series signal input module 22 and enables the data gap compensator module 23 to determine whether there are discontinuities in the data and generate compensating values as described above to fill in the discontinuities. Thereafter, the control module 14 enables the compensated data sequence to couple the data stream to the processing section 12 for processing by one of the modules 30 through 33 as selected by the operator from the option menu in step 104 (step 109). After the selected module 30 through 33 has processed the data stream, the control module enables the processed data to be coupled to the output section 13 for display to the operator (step 110).

Returning to step 105, if the control module 14 determines in that step that the operator had selected from the option menu that synthetic data be processed, it will sequence to step 111. As described above, if the operator in step 101 determines that the system 10 is to process synthetic data, he or she will select one of a number or non-linear dynamical systems, including in one embodiment the Van Der Pol system, the Duffing system and the Lorenz system. In step 111, the control module 14 will branch on the type of non-linear dynamical system selected by the operator in step 101. If the operator selected the Van Der Pol system, the control module 14 branches to step 112 in which it determines whether the selected Van Der Pol system was a forced system or an unforced system. If the control module 14 determines that the selected system was a forced system, it branches to step 113 to allow the operator to input a value for "F" (reference equation 2 above), the forcing coefficient. Thereafter, the control module 14 sequences to step 114 to allow the operator to input values for parameters σ and r (reference equation 2 above).

Returning to step 112, if the control module 14 determines in that step that the selected Van Der Pol system was an unforced system, it will sequence directly to step 114 to allow the operator to input values for parameters σ and r (reference equation 2 above).

Returning to step 111, if the control module 14 determines in that step that the operator had selected the Duffing or Lorenz system, it will sequence directly to step 114 to allow the operator to input values for the appropriate parameters for the selected system. In particular, if the operator had selected the Duffing system, he or she would provide the values for parameters a and b (reference equation 3 above). On the other hand, if the operator had selected the Lorenz system, he or she would provide values for parameters σ, r and b (reference equation 1 above).

Following step 114, the control module sequences to step 115, in which it enables the solution generator module 21 to solve the selected non-linear dynamical system (reference equations 1, 2 and 3 above) using the values for the respective parameters and, if the forced Van Der Pol system was selected, the force coefficient. As described above, the solution generator module 21 uses the fourth-order Runge-Kutta methodology of integrating a differential equation system to generate a synthetic data stream, which is coupled to the processing section 12. The control module 14 enables the one of the modules 30–33 of the processing section 12 selected by the operator from the options menu (step 104) to process the data stream (step 116) and the processed data to be provided to the output section 13 for display to the operator.

The invention provides a number of advantages. In particular, it provides a system which can be used to process and analyze input data provided by, for example, as sensor which can receive data which may contain a chaotic component, to determine whether it in fact contains a chaotic component and the nature of the chaotic component. In addition, the invention provides a system which can also process and analyze synthetic data to verify that the system can perform its processing and analysis functions properly.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A chaotic signal processing system for receiving an input signal provided by a sensor in a chaotic environment and performing a processing operation in connection therewith to provide an output useful in identifying one of a plurality of chaotic processes in said chaotic environment, said system comprising:

input means responsive to input data selection information for providing a digital data stream selectively representative of the input signal provided by said sensor or a synthetic input representative of a selected chaotic process;

processing means including a plurality of processing module means each for receiving the digital data stream from said input means and for generating therefrom an output useful in identifying one of a plurality of chaotic processes, the processing means being responsive to processing selection information to select one of said plurality of processing module means to provide the output; and control means for generating said input data selection information and said processing selection information in response to inputs provided by an operator.

2. A chaotic signal processing system as defined in claim 1 in which said input means includes:

means for receiving a digital data stream representative of the input signal provided by said sensor; and data gap compensation means for determining whether the digital data stream includes a discontinuity and, if so, generating synthetic data to compensate for the discontinuity.

3. A chaotic signal processing system as defined in claim 2 in which said data gap compensation means includes:

a discontinuity detector for detecting the existence of a discontinuity in the digital data stream;

discontinuity window establishment means for establishing a window including said detected discontinuity;

regression means for generating a polynomial function describing values of the digital data stream in the window; and discontinuity value generating means for using the polynomial function to generate synthetic data for the discontinuity.

4. A chaotic signal processing system as defined in claim 3 in which regression means operates in a series of iterations to generate a series of polynomials of increasing order, the regression means in each iteration generating an error value, the regression means continuing through said series of iterations until the error value stops decreasing.

5. A chaotic signal processing system as defined in claim 1 in which said input means includes:

a non-linear dynamical system selector module responsive to a non-linear dynamical system selection provided by said operator to select a non-linear dynamical system and receive parameter information from said operator; and a solution generator module for generating said synthetic input in response to the selected non-linear dynamical system and the parameter information and for further generating said digital data stream in response thereto.

6. A chaotic signal processing system as defined in claim 5 in which one said non-linear dynamical system is a Lorenz system which is defined by the equations:

$$\frac{dx}{dt} = \sigma(y-x)$$
$$\frac{dy}{dt} = rx - y - xz$$
$$\frac{dz}{dt} = xy - bz$$

where x, y and z are dependent variables, t an independent variable, and σ, r and b are parameters whose values will be provided by the operator.

7. A chaotic signal processing system as defined in claim 5 in which one said non-linear dynamical system is a Van Der Pol system which is defined by the equations $$\frac{dx}{dt} = y$$
$$\frac{dy}{dt} = -x + y - x^2 y + F(t)$$

where x and y are dependent variables, t is an independent variable, and F(t) is a forcing parameter that is provided if the Van Der Pol system is to be a forced system.

8. A chaotic signal processing system as defined in claim 5 in which one said non-linear dynamical system is a Duffing system which is defined by the equations $$\frac{dx}{dt} = y$$
$$\frac{dy}{dt} = -y - x^3 - \epsilon y - g\cos\omega t$$

where x and y are dependent variables, t is an independent variable, and $\epsilon$ and g are parameters whose values are provided by the operator.

9. A chaotic signal processing system as defined in claim 5 in which said solution generator module performs an integration operation in connection with the selected non-linear dynamical system.

10. A chaotic signal processing system as defined in claim 9 in which said solution generator module performs an integration operation in connection with the selected non-linear dynamical system using a fourth-order Runge-Kutta integration technique with adaptive step-size.

11. A chaotic signal processing system as defined in claim 1 in which said processing section includes a signal processor module which performs a Fourier transform operation in connection with the digital data stream from said input section.

12. A chaotic signal processing system as defined in claim 11 in which said signal processor module performs the Fourier transform operation using a fast-Fourier transform ("FFT") methodology.

13. A chaotic signal processing system as defined in claim 1 in which said processing section includes an auto-correlation module which performs an auto-correlation operation in connection with the digital data stream from said input section.

14. A chaotic signal processing system as defined in claim 1 in which said processing section includes a fractal dimension generation module which generates a fractal dimension value in connection with the digital data stream from said input section.

15. A chaotic signal processing system as defined in claim 1 in which said processing section includes a phase portrait generation module which generates a phase portrait in connection with the digital data stream from said input section.

* * * * *